United States Patent [19]

Clelford et al.

[11] Patent Number: 4,564,908
[45] Date of Patent: Jan. 14, 1986

[54] AUTOMATIC LIMITING OF HELICOPTER ENGINE TORQUE

[75] Inventors: Douglas H. Clelford, Trumbull; Joseph P. Skonieczny, Madison; Richard D. Murphy, Trumbull, all of Conn.

[73] Assignee: United Technologies Corporation, Hartford, Conn.

[21] Appl. No.: 470,368

[22] Filed: Feb. 28, 1983

[51] Int. Cl.[4] ............................................. G06F 15/50
[52] U.S. Cl. .................. 364/433; 244/17.13; 244/180
[58] Field of Search ................ 364/427, 428, 433, 434; 73/178 R, 178 T, 178 H; 318/584; 340/946, 967, 970, 977; 244/17.13, 180–182, 194

[56] References Cited

U.S. PATENT DOCUMENTS

| | | | |
|---|---|---|---|
| 4,004,756 | 1/1977 | Gerstine et al. | 244/17.13 |
| 4,109,886 | 8/1978 | Tribken et al. | 244/17.13 |
| 4,129,275 | 12/1978 | Gerstine et al. | 244/181 |
| 4,168,045 | 9/1979 | Wright et al. | 364/433 |
| 4,385,356 | 5/1983 | Verzella et al. | 244/182 |

*Primary Examiner*—Gary Chin
*Attorney, Agent, or Firm*—M. P. Williams; Gerald E. Linden

[57] ABSTRACT

A torque limiting altitude hold system for a helicopter engages torque limiting (56, 203) when excessive torque is anticipated (138, 202) as determined by the summation of present torque and torque rate times a reference value (126, 194) exceeds maximum torque with torque limiting engaged, altitude commands are faded out (42, 189) and torque commands are faded in (44, 190) and the collective command integrator is switched from altitude to torque (48, 54; 181, 185), torque limiting is ended in response to negative altitude commands or anticipated desired altitude signal (96, 150, 152; 205, 206); the anticipated desired altitude is determined by subtracting from the altitude error a time function of the altitude rate (84, 90; 193), torque limiting is not allowed to reengage for two seconds after disengaging (144, 204) nor within three seconds after reaching desired altitude during an automatic descent (146, 207), the system provides smooth transitions from altitude control to torque control, without oscillation or abrupt changes; control descents are arrested without torque limiting the engine.

5 Claims, 5 Drawing Figures

AUTOMATIC LIMITING OF HELICOPTER ENGINE TORQUE

The Government has rights in this invention pursuant to Contract No. N00019-77-C-0202 awarded by the Department of the Navy.

DESCRIPTION

1. Technical Field

This invention relates to helicopter automatic flight control systems, and more particularly to limiting the collective pitch command of the automatic flight control system so as to avoid demanding excessive engine torque.

2. Background Art

The overloading (or overstress) of aircraft engines can shorten engine life, and induce engine failure modes while in flight. To avoid overloading, some engine controls include torque limiting of a type that is incorporated directly in the engine fuel control. To provide torque limiting for aircraft engines that do not have that feature built in, torque limiting has been effected by limiting the commands that can result in excessive torque. In helicopters, it has been known to provide a torque limiting loop in the altitude hold portion of an automatic flight control system. A signal indicative of the difference between the current, actual engine torque and the maximum permitted torque is fed through a high gain amplifier and summed with the total altitude command signal before it is applied to the collective pitch outer loop servo actuator. The gain of the torque limiting loop is made extremely high so that when excessive torque results from any automatic flight control system collective command, the torque limiting signal simply overpowers the altitude command signal, thereby reducing the command provided to the collective outer loop. Because very high gain is utilized to override the altitude controller, and because the altitude error continues to build up in the integral gain path, the system is very abrupt when transitioning into and out of torque limiting. This is uncomfortable and disconcerting to the pilot, especially when the aircraft is hovering near the earth, and even more so when ing over water during nighttime search and rescue missions.

Another problem with prior torque limiting systems is that torque limiting frequently is invoked when arresting descent. Thus in an automatic approach to hover over water, torque limiting is very likely to transition in and out as the descent is arrested. Undershooting of desired altitude, when so close to the water, is dangerous indeed, and disconcerting to the pilot. During an automatic departure, desired altitude is likely to be obtained without excessive torque due to the increased lift which accompanies increased airspeed and torque limiting is usually disengaged prior to reaching altitude, so there is no overshoot. On the other hand, when hovering, or when gaining altitude at a constant airspeed, an overshoot results because of the torque not becoming relaxed until after the aircraft has reached desired altitude. And, the system then oscillates in and out of torque limiting.

DISCLOSURE OF INVENTION

Objects of the invention include provision of torque limiting in an automatic flight control system for a helicopter which avoids abrupt transitions between altitude and torque commands, which avoids overshooting of altitude and undershooting of altitude, and which permits arresting descent with whatever torque is necessary.

According to the present invention, a torque limiting altitude control system for a helicopter includes cross fade circuits for smooth transitioning between altitude and torque control, switches the integrator of the integral gain path of the altitude controller to the torque limiting command during torque limiting, anticipates incipient excessive torque and anticipates reaching desired altitude, to allow time for the cross fade circuits to operate smoothly, inhibits engaging torque limiting for a short period of time after it has become disengaged, and inhibits torque limiting for a certain period of time when reaching the reference altitude during an automatic descent.

The invention avoids abrupt transitioning between altitude and torque control, avoids high built-up error in the integral path of the altitude controller, permits arresting descents even with torque in excess of the maximum torque, and provides hysteresis between torque limiting and altitude control so as to avoid oscillatory transitions between torque and altitude control.

The invention may be implemented with dedicated hardware or may be implemented with simple computer routines utilized in a digital automatic flight control system, using apparatus and techniques which are well within the skill of the art in the light of the teachings which follow hereinafter.

The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

Figure 1:
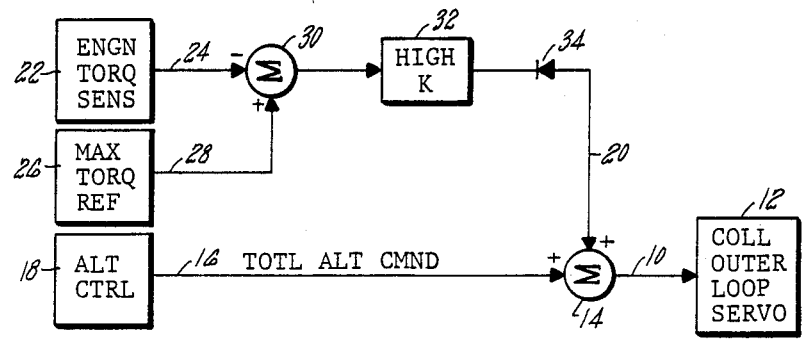
FIG. 1 is a simplified, schematic block diagram of a torque limiting altitude control system of the prior art.

Referring now to FIG. 1, a torque limiting altitude control system, of the type described briefly hereinbefore, provides a collective outer loop command on a signal line 10 to the collective outer loop servo 12. The command is provided by a summing junction 14 to which is fed the total altitude command on a line 16 from an altitude hold system 18 and a torque limiting command on a line 20 from a torque limiting portion of the system. A torque sensor 22 connected directly with the helicopter engine, provides a signal on a line 24 which is indicative of current, actual engine torque. A voltage reference 26 provides a signal on a line 28 indicative of the maximum design torque of the engine. The actual engine torque signal on line 24 is subtracted from the maximum engine torque reference signal on the line 28 in a summing junction 30. The error signal therefrom is provided to a very high gain amplifier 32, the output of which is unidirectional, as indicated by a diode 34, so that when the actual engine torque exceeds the maximum design torque, the signal on the line 20 will become highly negative thereby subtracting from the total altitude command signal on the line 16 so as to reduce the overall collective outer loop signal on the line 10. In this fashion, the torque limiting signal on the line 20 simply overpowers the altitude command signal on the line 16. But since torque limiting is retarding reaching the desired altitude, the altitude command can be expected to continue to increase in the wrong direction, seeking to achieve higher altitude, and the integral gain path of the altitude hold system 18 continues to accumulate larger and larger error. When the desired altitude is ultimately reached, using a collective command which results in maximum torque, the total altitude command signal will suddenly become very small causing a negative collective command signal, as a result of the negative torque limiting signal on the line 20, so that the engine torque immediately goes low and some altitude is lost causing the altitude command to again increase. In this fashion, transitions are abrupt, and oscillatory.

Figure 2:
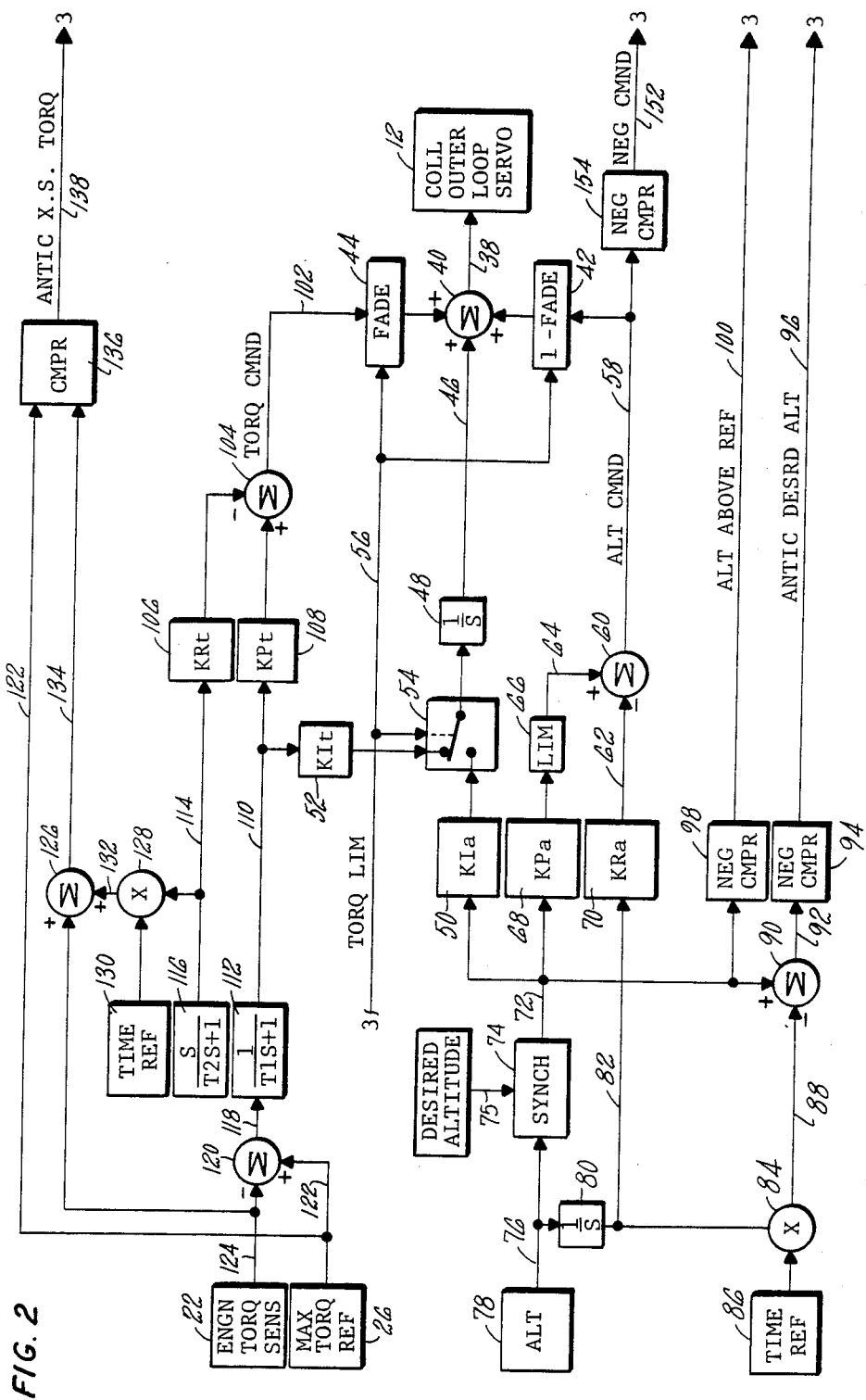
FIG. 2 is a simplified, schematic block diagram of a torque limiting altitude control portion of an automatic flight control system in accordance with the present invention.

Referring now to FIG. 2, the collective outer loop servo 12 is provided a collective pitch command signal on the line 38 from a summing junction 40 which is fed altitude command signals through a fade circuit 42 and torque command signals through a fade circuit 44, as well as integral path signals on a line 46 from an integrator 48 that is selectively connectable to either the altitude integral gain amplifier 50 or the torque integral gain amplifier 52 by means of a switch 54. When torque limiting is engaged, a signal is provided on a line 56 (as described with respect to FIG. 3 hereinafter) to cause the switch 54 to connect the integrator 48 to the torque integral amplifier 52 (as shown) and to cause the fade circuit 44 to fade up (in) as well as causing the fade circuit 42 to fade down (out). Thus there is a smooth transition from altitude control to torque control. The fade circuit 42 is fed an altitude command on a line 58 provided by a summing junction 60 which subtracts a rate signal on a line 62 from a limited proportional signal on a line 64. The signal on the line 64 is provided by a limiter 66 fed by a proportional gain amplifier 68. The signal on line 62 is provided by a rate gain amplifier 70. The integral and proportional amplifiers 50, 68 are fed an altitude error signal on a line 72 provided by a synchronizing circuit 74 (one which provides the error signal 72 simply as the difference between desired altitude and current altitude). The synchronizer 74 is responsive to a desired altitude signal on a line 75 and to a current altitude signal on a line 76 from a suitable altimeter 78 (which may be a barometric altimeter at high altitude and may be a radar altimeter at low altitude, or may be the altitude portion of an automatic approach or departure system). The altitude signal on line 76 is passed through a differentiator 80 to provide an altitude rate signal on a line 82. This is fed to the rate gain amplifier 70 as well as to a multiplier 84, the other input of which is a signal from a voltage reference 86 indicative of some period of time (such as two seconds or so). The multiplier 84 provides an altitude increment signal on the line 88 indicative of how much the altitude should change in the period of time indicated by the reference 86. This is summed with the altitude error signal on the line 72 in a summing junction 90 to provide an anticipated altitude error signal on the line 92. This is fed through a negative comparator 94 to provide an anticipated desired altitude signal on a line 96 which occurs whenever the anticipated altitude error signal on the line 92 goes negative. The altitude error signal on the line 72 is fed to another negative compare circuit 98 to provide an altitude above reference signal on the line 100 whenever the altitude error signal on line 72 is negative. These signals are utilized to control the engagement and disengagment of torque limiting, as is described with respect to FIG. 3 hereinafter.

The fade circuit 44 is fed a torque command signal on a line 102 which is provided by a summing junction 104 responsive to a rate gain amplifier 106 and a proportional gain amplifier 108. The amplifier 108 is fed a lag torque error signal on a line 110 from a lag circuit 112 and the amplifier 106 is provided with a lagged rate of torque signal on a line 114 from a lagged rate circuit 116. In those circuits, T1 and T2 are time constants and S is the LaPlacian operator. The lag circuit 112 is fed the torque error signal on a line 118 provided by a summing junction 120 in response to a maximum torque reference signal on a line 122 from which is subtracted the actual engine torque signal on a line 124. The actual engine torque signal on line 124 is fed to the lagged rate circuit 116 as well as to a summing junction 126, the other input of which is from a multiplier 128. The multiplier 128 is fed the output of the lagged circuit 116 as well as a signal indicative of a unit of time from a voltage reference 130. The multiplier provides an increment of torque error signal on a line 132 for summation with current actual torque so as to provide an anticipated torque signal on a line 134. This is compared in a comparator 136 with the maximum torque signal on the line 122 and provides an anticipated excessive torque signal on a line 138 whenever the current torque level and the torque rate indicates that maximum torque is about to be exceeded.

Figure 3:
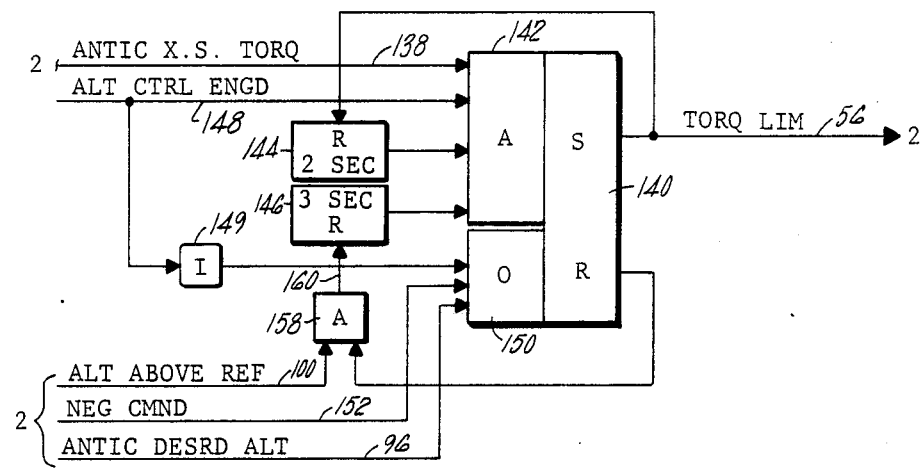
FIG. 3 is a simplified, schematic block diagram of control logic for determining when torque limiting is to be engaged in accordance with the invention.

Referring now to FIG. 3, the torque limiting signal on the line 56 is provided by a bistable device 140 when it is in its set state. The bistable device 140 is set when all of the inputs to an AND circuit 142 are present. Provided signals are present from each of two timers 144, 146, indicating that they have reached their terminal (or other decoded) count, and the altitude control is engaged, as indicated by a signal on a line 148 (from the automatic flight control system), then whenever excessive torque is anticipated as indicated by the signal on the line 138, the AND circuit 142 will cause the bistable device 140 to become set, and thus provide the torque limiting signal on the line 56. When this happens, the signal on line 56 is applied to the reset of the two second timer 144 and holds it in its reset state throughout the period torque limiting is engaged. When torque is no longer engaged (as described hereinafter), the torque limiting signal will not be present on line 56 at the reset input of the timer 144 so it will begin to accumulate counts (such as from an internal clock) until it has a count indicating two seconds have elapsed. During that two second period, the AND circuit 142 cannot again be satisfied, thereby causing torque limiting not to be reengageable within two seconds after becoming disengaged.

The bistable device 140 is reset by either input signal to an OR circuit 150. One of the signals indicates that the altitude control is not engaged, as provided from an inverter. Another of the signals is the anticipated desired altitude signal on the line 96. The other of these signals is a negative command signal on a line 152 which is generated in FIG. 2 by a negative compare circuit 154 whenever the altitude command signal on line 58 is negative (meaning that less torque is to be required). Whenever the bistable device 140 is reset, a signal on a line 156 will be provided to an AND circuit 158. During automatic descents, the altitude is always above the reference altitude so that the altitude above reference signal on the line 100 will be present. This satisfies the AND circuit 158 so that it provides a signal on a line 160 to the reset input of the three second timer 146. The timer therefore provides no output during automatic descent with torque limiting disengaged. When, however, the aircraft descends to the desired altitude, the signal on the line 100 will disappear so that the signal on the line 160 will disappear, and the timer will begin to count to a count indicative of three seconds. This precludes torque limiting from being engaged within three seconds of reaching desired altitude in an automatic descent, thereby permitting a limited overtorque situation to arrest the automatic descent.

Instead of being implemented in dedicated hardware as described with respect to FIGS. 2 and 3, all of the functions of the present invention except for the engine torque sensor, the altimeter, and the collective outer loop servo referred to in FIGS. 2 and 3 may be implemented by suitable programming of a digital computer. The digital computer may take the form of one or two computers of the type described in U.S. Pat. No. 4,270,168. The collective outer loop calculations of FIG. 4 may be performed in the collective outer loop calculation subroutine 1404 described in the third autopilot routine of FIG. 14 of the aforementioned patent. The torque limiting logic of FIG. 5 may be performed in either the duplex operation status checks subroutine 1203, illustrated in the first autopilot routine of FIG. 12 in said patent, or may be performed in a single computer embodiment in a routine similar to the duplex/simplex operation status checks subroutine 1104, in the zero autopilot routine of FIG. 11 in said patent.

Figure 4:
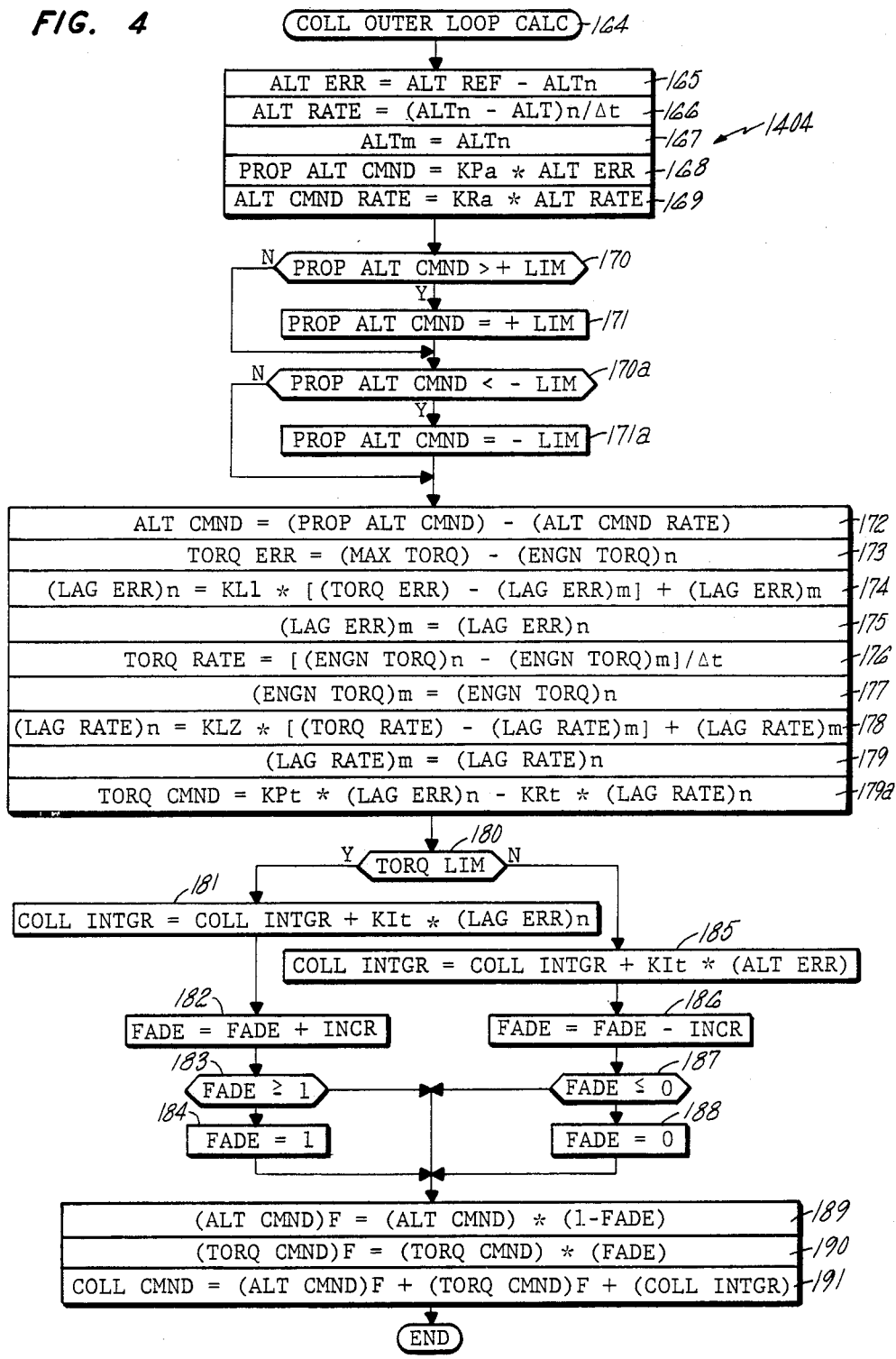
FIG. 4 is a logic flow diagram of a computer routine for calculating collective outer loop commands in a computerized torque limiting automatic flight control system in accordance with the present invention.

Referring now to FIG. 4, the collective outer loop calculation routine 1404 is reached through an entry point 164 and a step 165 generates altitude error as the difference between the altitude reference and the current altitude, indicated by "n". This is equivalent to the function of the synchronizer 74 of FIG. 2. Then a step 166 provides the altitude rate as the difference between the current altitude and the altitude of the prior cycle, designated by "m" divided by the duty cycle ΔT. This is equivalent to the differentiator 80 of FIG. 2. Then a step 167 updates the last altitude to the current altitude for use in the next cycle. A step 168 provides the proportional altitude command as the product of the proportional altitude gain (KPa) and the altitude error, which is the function of the amplifier 68 in FIG. 2. And a step 169 generates the altitude command rate as the product of the rate gain (KRa) and the altitude rate, which is equivalent to the amplifier 70 in FIG. 2. Then a test 170 determines if the proportional altitude command exceeds the limit, and if it does, a step 171 causes the proportional altitude command to be equal to the limit for such command, as an equivalent to the limiter 66 in FIG. 2. Otherwise, a negative result of test 170 will cause step 171 to be bypassed. Then a test 170a determines if the proportional altitude command is less than the negative limit, and if it is, a step 171a causes a proportional altitude command to be equal to the minus limit. Otherwise, a negative result of test 170a will cause step 171a to be bypassed. Then in a step 172, the altitude command is generated as the difference between the proportional altitude command and the altitude command rate, which is equivalent to the summing junction 60 in FIG. 2.

Similar signals are generated with respect to torque. In a step 173, a torque error signal is generated as the difference between maximum torque and the current engine torque (designated by "n"). In a step 174, a current lag error (deignated by "n") is generated as a constant (KL1, equivalent to T1 in FIG. 2), times the difference between the torque error and the lag error generated in the preceding cycle (designated by "m"), summed with the lag error generated for the preceding cycle. This is equivalent to the lag circuit 112 in FIG. 2. Then in a step 175, the lag error to be used as the preceding lag error in the next cycle is updated to equal the lag error generated in the current cycle. In a step 176, torque rate is generated as the difference between engine torque in the current cycle and engine torque in the preceding cycle divided by the duty cycle ΔT, and then the preceding engine torque for the next cycle is updated in a step 177. The lagged rate of engine torque (equivalent to the lag rate circuit 116 of FIG. 2) is generated in a step 178 as a lag constant (KL2, equivalent to T2 in FIG. 2) times the difference between the torque rate and the lag rate generated in the preceding cycle, summed with the lag rate generated in the preceding cycle. And the preceding lag rate for the next cycle is updated in a step 179 to equal that of the current cycle. Then the torque command is generated in the step 179a as the difference between the proportional constant (KPt) times the lagged error of the current cycle and the torque rate constant (KRt) times lagged rate of the current cycle. This is equivalent to the amplifiers 106, 108 and the summing junction 104 of FIG. 2.

The functions controlled in FIG. 2 by the torque limiting signal on line 56 are performed at the bottom of FIG. 4. A test 180 determines if torque limiting is in effect or not. If so, an affirmative result of test 180 reaches a step 181 which causes the collective integrator value to be generated as equal to the current collective integrator value plus some integral constant (KIt) times the lag error of the current cycle, which is equivalent to the effect of the amplifier 52 on the integrator 48 with the switch 54 in the position shown in FIG. 2. Then in a step 182, a fade factor is incremented by a fade increment and a test 183 determine if the fade factor is greater than 1. If it is, an affirmative result of test 183 reaches a step 184 to set the fade factor equal to 1. Otherwise, a negative result of test 183 bypasses the step 184.

If torque limiting is not in effect, a negative result of test 180 reaches a step 185 in which the collective integrator value is generated as equal to the collective integrator value currently existing plus an integral constant (KIa) times the altitude error, which is equivalent to the effect of the amplifier 50 on the integrator 48 with the switch 54 in the position opposite to that shown in FIG. 2. Then in a step 186, the fade factor is decremented by the fade increment and a test 187 determines if the fade factor is less than zero. If it is, an affirmative result of test 187 reaches a step 188 where the fade factor is set equal to zero; otherwise a negative result of test 187 causes step 188 to be bypassed.

In a step 189, a faded altitude command (designated by "F") is generated as the product of the altitude command and one minus the fade factor. In a step 190, the faded torque command is generated as the product of the torque command and the fade factor. In a step 191, the collective command is generated as the summation of the faded altitude command, the faded torque command and the collective integrator. The steps 189–191 are equivalent to the fade circuits 42, 44 and the summing junction 40, in FIG. 2.

Figure 5:
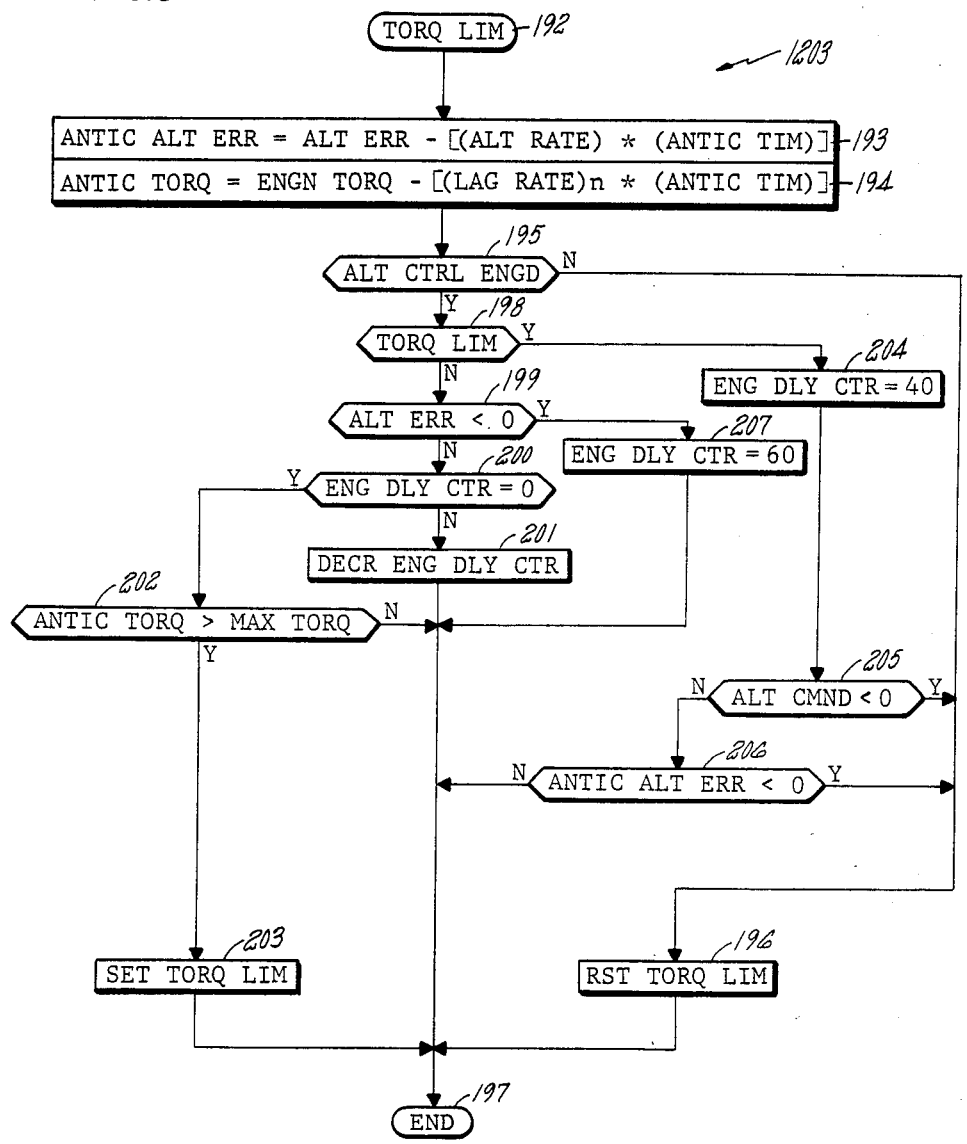
FIG. 5 is a logic flowchart of a computer routine for engaging and disengaging torque limiting in accordance with the present invention.

Referring now to FIG. 5, the logical functions for generating the torque limiting signal on line 56 in FIG. 3, and immediately related functions of FIG. 2, are provided in a digital fashion. The torque limiting routine is reached through an entry point 192 and a first step 193 generates anticipated altitude error as the difference between altitude error and the product of altitude rate and the anticipation time. This is equivalent to the reference 86, the multiplier 84 and the summing junction 90, in FIG. 2. Anticipated torque is generated in a step 194 as a summation of engine torque and the product of lagged rate of the current cycle and anticipation time. This is equivalent to the reference 130, the multiplier 128, and a summing junction 126 in FIG. 2. Then a step 195 determines if altitude hold is engaged. If not, a negative result of test 195 reaches a step 196 to reset a torque limiting flag (equivalent to the bistable device 140 being reset in FIG. 3). And the routine is ended at a point 197. If altitude hold is engaged, an affirmative result of test 195 reaches a test 198 to determine if torque limiting is engaged. Initially, it is not, so a negative result of test 198 will reach a test 199 to determine if the altitude error is negative. Assuming it is not, a negative result of test 199 will reach a test 200 to determine if the engaged delay counter is zero or not. This is equivalent to the two counters 144, 146 in FIG. 3 having timed out after their resets have been released. If the counter has not timed out, a negative result of test 200 will reach a step 201 to decrement the engine delay counter. But if the engine delay counter has timed out to zero, an affirmative result of test 200 will reach a test 202 to determine if the anticipated torque is greater than the maximum torque, which is equivalent to the compare circuit 136 in FIG. 2. If so, it reaches a step 203 to set torque limiting, which is the equivalent of setting the bistable device 140 in FIG. 3.

Assuming torque limiting to have been engaged, an affirmative result of test 198 reaches a step 204 to set the engage delay counter equal to a count of 40. This is because the present embodiment is assumed to be operating at 20 Hz, meaning the counter will be incremented every 50 milliseconds. By setting the engage delay counter to 40, the step 201 will be passed through forty times to decrement the counter to zero in just two seconds. This provides the two second hysteresis of the timer 144 in FIG. 3. And then a test 205 determines if the altitude command is negative; if it is, an affirmative result will reach the step 196 to reset torque limiting. If it is not, it reaches a test 206 to determine if anticipated altitude error is negative. If so, it will reach the step 196 to reset torque limiting. Otherwise, negative results of tests 205 and 206 will cause the program to end at point 197. If torque limiting is not engaged but an affirmative result of test 199 indicates that an automatic descent is in progress, this reaches a step 207 which sets the engage delay counter to 60. At the 20 Hz rate, this will cause three seconds to elapse before the engage delay counter can be restored to zero, thereby ensuring three seconds during which the engine may be overstressed to arrest a descent before engaging torque limiting, equivalent to the function of the timer 146 in FIG. 3.

For simplicity, the embodiments herein have been described with respect only to the collective outer loop servo. However, torque limiting may be applied in a fully analogous fashion to the collective inner loop servo which provides altitude stability. This may be achieved simply by providing a fade circuit for the torque controller (torque error and torque rate) and using a one minus fade circuit for the altitude controller (proportional, rate and vertical acceleration signals). These controller signals are then summed and applied to the collective inner loop servo, in a well known way.

The invention may be implemented with a variety of delay times, various types of filtering and limiting, and other known design characteristics, to suit any implementation thereof. Similarly, although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. A torque limiting altitude control system for a helicopter, comprising:

collective pitch servo means (12) for controlling the collective pitch of the helicopter main rotor blades in response to a collective command signal;

sensor means (78) for providing an actual altitude signal indicative of the current actual altitude;

reference means (75) for providing an altitude reference signal indicative of a currently desired altitude;

synchronizer means (74) for providing an altitude error signal indicative of the difference between said actual altitude signal and said altitude reference signal;

means (60,66,68,70,80) for providing an altitude command signal indicative of the difference between a function of said altitude error signal and a function of the rate of change of said actual altitude signal;

sensor means (22) for providing an actual torque signal indicative of the current actual engine torque;

reference means (26) for providing a torque reference signal indicative of the maximum design operating torque for the engine;

difference means (120) for providing a torque error signal indicative of the difference between said actual torque signal and said torque reference signal;

means (104,106,108,112,116) for providing a torque command signal indicative of the difference between a function of said torque error signal and a function of the rate of change of said actual torque signal;

means (116,126,128,130,136) for providing an excess torque signal indicative of an excessive engine torque condition;

logic means (140) for providing a torque limiting signal in response to the provision of said excess torque signal, and for discontinuing said torque limiting signal in response to said altitude command signal being negative;

means (54) for providing an integral collective signal in response to a function of said torque error signal in said presence of said torque limiting signal, and for providing said integral collective signal as a function of said altitude error signal in the absence of said torque limiting signal;

summing means (40) for providing said collective command signal as the sum of the integral collective signal and two other signals;

first fade means (44) for fading in said torque command signal as one of said two other signals to said summing means so as to reduce said collective command signal in response to the provision of said torque limiting signal, and for fading out said torque command signal as the one of said two other signals to said summing means so as to increase said collective command signal in response to the discontinuation of said torque limiting signal; and second fade means (42) for fading out said altitude command signal as the other of said two other signals to said summing means so as to reduce said collective command signal in response to the provision of said torque limiting signal, and for fading in said altitude command signal as the other of said two other signals to said summing means so as to increase said collective command signal in response to the discontinuation of said torque limiting signal.

2. Apparatus according to claim 1 further comprising means for providing an anticipated torque increment signal as a function of the rate of change of said actual torque signal multiplied by a time reference signal indicative of an anticipation period of time, for providing an anticipated torque signal as a summation of said anticipated torque increment signal and said actual torque signal, and for providing said excess torque signal in response to said anticipated torque signal being indicative of a torque in excess of the torque represented by said torque reference signal.

3. Apparatus according to claim 1 further comprising means for providing an anticipated altitude increment signal as a function of the rate of change of said actual altitude signal multiplied by a time reference signal indicative of an anticipation period of time, for providing an anticipated altitude signal as a summation of said anticipated altitude increment signal with said altitude error signal, for providing an anticipated desired altitude signal in response to said altitude error signal being negative, and for discontinuing provision of said torque limiting signal in response to said anticipated desired altitude signal.

4. Apparatus according to claim 1 further comprising means responsive to the discontinuation of said torque limiting signal to prevent provision of said torque limiting signal in response to said excess torque signal for a given period of time after said torque limiting signal is no longer provided.

5. Apparatus according to claim 1 further comprising means responsive to the absence of said torque limiting signal concurrently with said altitude error signal being negative for preventing said torque limiting signal from being provided in response to the presence of said excess torque signal for a given predetermined time interval after said altitude error signal ceases to be negative, without providing said torque limiting signal in response to said excess torque signal.

* * * * *